(12) United States Patent
Larsson et al.

(10) Patent No.: US 12,518,157 B2
(45) Date of Patent: Jan. 6, 2026

(54) DYNAMIC NETWORK CONFIGURATION

(71) Applicant: Telefonaktiebolaget LM Ericsson (publ), Stockholm (SE)

(72) Inventors: Tony Larsson, Upplands Väsby (SE); Johan Haraldson, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1135 days.

(21) Appl. No.: 17/435,468

(22) PCT Filed: Mar. 1, 2019

(86) PCT No.: PCT/SE2019/050179
§ 371 (c)(1),
(2) Date: Sep. 1, 2021

(87) PCT Pub. No.: WO2020/180218
PCT Pub. Date: Sep. 10, 2020

(65) Prior Publication Data
US 2022/0230062 A1    Jul. 21, 2022

(51) Int. Cl.
*G06N 3/08* (2023.01)
*G06N 3/044* (2023.01)
(Continued)

(52) U.S. Cl.
CPC ............... *G06N 3/08* (2013.01); *G06N 3/044* (2023.01); *G06N 20/00* (2019.01); *H04L 41/16* (2013.01)

(58) Field of Classification Search
CPC .......... G06N 3/08; G06N 3/044; G06N 20/00; G06N 3/045; H04L 41/16; H04L 41/147; G06F 9/5027
See application file for complete search history.

(56) References Cited

U.S. PATENT DOCUMENTS

2011/0078303 A1  3/2011  Li et al.
2012/0185867 A1  7/2012  Archer et al.
(Continued)

FOREIGN PATENT DOCUMENTS

CN  104426953 A   3/2015
EP  3182283 A1    6/2017
(Continued)

OTHER PUBLICATIONS

Trindade et al, "Management of Resource at the Network Edge for Federated Learning", 2015, Elsevier (Year: 2015).*

(Continued)

*Primary Examiner* — Hope C Sheffield
(74) *Attorney, Agent, or Firm* — Weisberg I.P. Law, P.A.

(57) ABSTRACT

A method for dynamically configuring a network is proposed for training a machine learning model. The network includes a server computing device and a plurality of client computing devices. The method is performed at a computing device communicatively coupled to the network and includes the following: selecting client computing devices to participate in training the model; determining a first value of an evaluation metric of the model based on the selected client computing devices; determining the presence of an adjustment trigger; adjusting the number of client computing devices used to determine the value of the evaluation metric in response to the adjustment trigger; determining a second value of the evaluation metric based on the adjusted number of client computing devices; and setting the number of client computing devices participating in training the model accordingly.

19 Claims, 7 Drawing Sheets

(51) Int. Cl.
  *G06N 20/00* (2019.01)
  *H04L 41/16* (2022.01)

(56) References Cited

U.S. PATENT DOCUMENTS

| | | | |
|---|---|---|---|
| 2015/0040131 A1 | 2/2015 | Shan et al. | |
| 2017/0149687 A1* | 5/2017 | Udupi | H04L 47/83 |
| 2018/0113742 A1* | 4/2018 | Chung | G06F 9/4881 |
| 2018/0302291 A1 | 10/2018 | Srinivasan et al. | |
| 2018/0307945 A1* | 10/2018 | Haigh | G06F 18/214 |
| 2018/0341851 A1 | 11/2018 | Chung et al. | |
| 2018/0365581 A1 | 12/2018 | Vasseur et al. | |
| 2020/0167204 A1* | 5/2020 | Aronovich | G06F 9/505 |

FOREIGN PATENT DOCUMENTS

| | | |
|---|---|---|
| WO | 2015/027935 A1 | 3/2015 |
| WO | 2017027171 A1 | 2/2017 |

OTHER PUBLICATIONS

International Search Report and Written Opinion dated Nov. 8, 2019 for International Application No. PCT/SE2019/050179 filed Mar. 1, 2019, consisting of 11-pages.
H. Brendan McMahan et al..; Communication-Efficient Learning of Deep Networks from Decentralized Data; Proceedings of the 20th International Conference on Artificial Intelligence and Statistics (AISTATS), 2017, consisting of 11-pages.
Jialei Wang et al.; Distributed Multitask Learning; Proceedings of the 19th International Conference on Artificial Intelligence and Statistics (AISTATS), 2016.
Brendan McMahan et al.; Federated Learning: Collaborative Machine Learning without Centralized Training Data; Google AI Blog; Apr. 6, 2017, consisting of 4-pages.
Jakub Konecny et al.; Federated Learning: Strategies for improving Communication Efficiency; NIPS Workshop on Private Multi-Party Machine Learning, 2016, consisting of 10-pages.
Virginia Smith et al.; Federated Multi-Task Learning; 31st Conference on Neural Information Processing Systems (NIPS), 2017, consisting of 19-pages.
Jakub Konecny et al.; Federated Optimization: Distributed Optimization Beyond the Datacenter; ArXiv, 2015, consisting of 5-pages.
H. Brendan McMahan et al.; Learning Differentially Private Recurrent Language Models; ICLR 2018 Conference Blind Submission, Feb. 2018, consisting of 14-pages.
European Search Report dated Sep. 2, 2022 for Application No. 19917988.8, consisting of 10 pages.
Chinese Office Action and English translation of the Chinese Office Action dated Apr. 30, 2025 issued in corresponding Chinese Application No. 201980093337.2, consisting of 24 pages.

* cited by examiner

DYNAMIC NETWORK CONFIGURATION

CROSS-REFERENCE TO RELATED APPLICATIONS

This application is a Submission Under 35 U.S.C. § 371 for U.S. National Stage Patent Application of International Application Number: PCT/SE2019/050179, filed Mar. 1, 2019 entitled "DYNAMIC NETWORK CONFIGURATION," the entirety of which is incorporated herein by reference.

TECHNICAL FIELD

The present disclosure relates machine learning. In particular, the disclosure relates to dynamic configuration of networks for training machine learning models.

BACKGROUND

This section is intended to provide a background to the various embodiments of the invention that are described in this disclosure. Therefore, unless otherwise indicated herein, what is described in this section should not be interpreted to be prior art by its mere inclusion in this section.

In computer science, artificial intelligence (AI) is intelligence demonstrated by machines. A typical AI system takes actions that maximise its chances of successfully achieving a certain goal by using computational methods to automatically learn and improve from data and experience without being explicitly programmed. This is known as machine learning. In order to train a computational model thoroughly, it is required that the model performs many training iterations on many different sets of data. The model can then be updated based on feedback from its performance. In general, the more data that can be accessed to train a machine learning model, the more accurate that model will become.

The computational power required to perform such training is vast. Therefore, a decentralised approach to machine learning has been developed. In decentralised learning, devices in a network collaboratively train a shared model using their own respective training data, without that training data leaving the device. This has a number of advantages. Using a large number of devices in a network provides significant increases in computational power available for training. By training models based on data locally stored in the training devices, such sensitive data can be used in training without being transferred over the network. Furthermore, this approach allows limitations in uplink bandwidth and network coverage to be mitigated.

Several algorithms have been presented to enable decentralised learning. The algorithm presented by Google, named "FederatedAveraging", has led to the coining of the term "federated learning". This algorithm addresses several real-world challenges; the ability to handle unbalanced and non-IID (independent and identically distributed) data, massively distributed data (where there are more devices than the average number of data samples that can be used for training per device), reductions in communication needed for training, as well as limitations in device connectivity. Empirical results from show that the FederatedAveraging algorithm works for different model architectures; multi-layer perceptron, convolutional neural networks, and recurrent neural networks.

In the FederatedAveraging algorithm, a server first initialises the weights of a neural network model. For every training round, the server sends the model weights to a fraction of client devices that are available to take part of the training, and the client devices return their evaluation of the model performance. Each client being part of the training initialises a local copy of the neural network model with the received weights and runs one or more epochs (where 1 epoch=1 forward pass+1 backward pass for all available training samples), resulting in a set of updated weights. The client then returns some evaluation of how the model performed along with some indication of the updated weights, for example the difference between the weights received from the server and the updated weights. The server can then decide how to update to model to increase its performance.

Despite the advantages of the decentralised learning approaches discussed above, there are a number of limitations. For example, current frameworks are based on assumptions or decisions that are not valid or suitable in a real-life deployment. As one example, the number of client devices needed for training is usually set to a fixed fraction of the total number of client devices, where the fraction is determined by experiments done beforehand. This can be problematic in a real-life scenario since the number of client devices needed to adequately train a model can vary in different deployments as well as over time. As another example, the selection of which client devices participate in training is often randomised among all clients. However, in reality, not all clients are necessarily suitable for training machine learning models.

The methods, devices and systems described in the present disclosure aim to mitigate at least some of these issues and provide improvements to decentralised machine learning.

SUMMARY

The methods of the present disclosure allow the number of client devices used for training a machine learning model to be dynamically adjusted, and also enables determination of which devices should be used where a number of client devices are available. The disclosed methods can detect when the performance of a model is below an acceptable level. This detection will trigger evaluation of a case where a different number of devices are used in training and any necessary adjustment to the number can then be made. This ensures that a correct amount of client devices is used to train a machine learning model, such that the model is adequately trained without wasting computational resources or transmission capacity. Essentially, what is desired is to find the minimum number of client computing devices 104 that are needed to achieve adequate performance for a particular use case. If the number of devices training the model is minimised, the remaining computational capacity of the network 100 is increased. Further, the fewer devices that participate in training, the fewer messages need to be sent between those devices and a device controlling the process, thus also saving transmission capacity of the network 100. The system can adapt to changes such as data distribution changes or client devices being added to, or removed from, the system. Furthermore, it can be ensured that those devices selected for training are the most suitable to do so.

The present disclosure also allows such decentralised learning systems to be implemented in a telecommunications network, where computing resources are distributed from centrally located nodes in the core network all the way to the base stations in the very edge of the access network. A telecommunications network involves a large number of nodes, both virtual and physical, which is ideally suited to decentralised learning scenarios where a large number of client devices are needed to teach a machine learning algorithm to learn a task. Furthermore, a telecommunications network infrastructure on consists fixed links, is powered by an electricity grid, and has high availability. This allows the relaxation of constraints present in current approaches, where battery optimisation, coverage limitations, availability limitations and privacy concerns are key factors.

In accordance with a first aspect of the disclosure there is provided a method for dynamically configuring a network for training a machine learning model, the network comprising a server computing device and a plurality of client computing devices configured to perform training of the machine learning model, the method performed at a computing device communicatively coupled to the network and comprising selecting a number of the plurality of client computing devices to participate in training the machine learning model, determining a first value of an evaluation metric of the machine learning model based on the selected number of client computing devices, determining the presence of an adjustment trigger, adjusting the number of client computing devices used to determine the value of the evaluation metric in response to determining the presence of the adjustment trigger, determining a second value of the evaluation metric based on the adjusted number of client computing devices, and setting the number of client computing devices participating in training the machine learning model based on the second value of the evaluation metric.

Optionally, determining the presence of an adjustment trigger comprises determining that the first value of the evaluation metric indicates performance of the machine learning model below a threshold level, and adjusting the number of client computing devices used to determine the value of the evaluation metric comprises increasing the number of client computing devices participating in training the machine learning model. Optionally, the method further comprises causing training of the machine learning model by the increased number of client computing devices before determining the second value of the evaluation metric. Optionally, setting the number of client computing devices participating in training comprises reverting to the selected number of client computing devices if the second value of the evaluation metric is the same as or less than the first value of the evaluation metric, maintaining the increased number of client computing devices if the second value of the evaluation metric indicates performance of the machine learning model above the threshold level, or further increasing the number of client computing devices participating in training the machine learning model if the second value of the evaluation metric indicates performance of the machine learning model above the first value of the evaluation metric and below the threshold level.

Optionally, determining the presence of an adjustment trigger comprises determining that the first value of the evaluation metric indicates performance of the machine learning model above a threshold level, and determining that a predetermined period has passed since a previous adjustment to the number of client computing devices used to determine the value of the evaluation metric.

Optionally, adjusting the number of client computing devices used to determine the value of the evaluation metric comprises using a subset of the selected number of client computing devices to determine the value of the evaluation metric. Optionally, setting the number of client computing devices participating in training comprises maintaining the selected number of client computing devices if the second value of the evaluation metric indicates performance of the machine learning model below the threshold level, or decreasing the number of client computing devices participating in training to the number of client computing devices in the subset if the second value of the evaluation metric indicates performance of the machine learning model above the threshold level.

Optionally, adjusting the number of client computing devices used to determine the value of the evaluation metric comprises decreasing the number of client computing devices participating in training the machine learning model. Optionally, the method further comprises causing training of the machine learning model by the decreased number of client computing devices before determining the second value of the evaluation metric. Optionally, setting the number of client computing devices participating in training comprises reverting to the selected number of client computing devices if the second value of the evaluation metric indicates performance of the machine learning model below the threshold level, or maintaining the decreased number of client computing devices if the second value of the evaluation metric indicates performance of the machine learning model above the threshold level.

Optionally, the method further comprises causing training of the machine learning model by the selected number of client computing devices before determining the first value of the evaluation metric. Optionally, the network comprises a telecommunications network, and the plurality of client computing devices comprises a plurality of access nodes of the telecommunications network.

Optionally, the method further comprises determining a resource capacity of at least one of the client computing devices, and selecting client computing devices to participate in training the machine learning model based on the determined resource capacities. Optionally, determining a resource capacity of at least one of the client computing devices comprises predicting the resource capacity at a time in the future at which the machine learning model will be trained.

Optionally, the computing device performing the method comprises the server computing device. Optionally, the computing device performing the method comprises a plurality of computing devices. Optionally, training the machine learning model comprises using federated learning. Optionally, determining the first value of the evaluation metric of the machine learning model is performed periodically.

In accordance with a second aspect of the disclosure there is provided a computer program, comprising instructions which, when executed on processing circuitry, cause the processing circuitry to carry out the method.

In accordance with a third aspect of the disclosure there is provided a computer program product having stored thereon a computer program comprising instructions which, when executed on processing circuitry, cause the processing circuitry to carry out the method.

In accordance with a fourth aspect of the disclosure there is provided a computing device for dynamically configuring a network for training a machine learning model, the network comprising a server computing device and a plurality of client computing devices configured to perform training of the machine learning model, the computing device communicatively coupled to the network and comprising processing circuitry and a memory, the memory containing instructions executable by the processing circuitry whereby the computing device is operative to select a number of the plurality of client computing devices to participate in training the machine learning model, determine a first value of an evaluation metric of the machine learning model based on the selected number of client computing devices, determine the presence of an adjustment trigger, adjust the number of client computing devices used to determine the value of the evaluation metric in response to determining the presence of the adjustment trigger, determine a second value of the evaluation metric based on the adjusted number of client computing devices, and set the number of client computing devices participating in training the machine learning model based on the second value of the evaluation metric.

Optionally, the computing device is further configured to determine the presence of an adjustment trigger by determining that the first value of the evaluation metric indicates performance of the machine learning model below a threshold level, and adjust the number of client computing devices used to determine the value of the evaluation metric by increasing the number of client computing devices participating in training the machine learning model. Optionally, the computing device is further configured to cause training of the machine learning model by the increased number of client computing devices before determining the second value of the evaluation metric. Optionally, the computing device is further configured to set the number of client computing devices participating in training by reverting to the selected number of client computing devices if the second value of the evaluation metric is the same as or less than the first value of the evaluation metric, maintaining the increased number of client computing devices if the second value of the evaluation metric indicates performance of the machine learning model above the threshold level, or further increasing the number of client computing devices participating in training the machine learning model if the second value of the evaluation metric indicates performance of the machine learning model above the first value of the evaluation metric and below the threshold level.

Optionally, the computing device is further configured to determine the presence of an adjustment trigger by determining that the first value of the evaluation metric indicates performance of the machine learning model above a threshold level, and determining that a predetermined period has passed since a previous adjustment to the number of client computing devices used to determine the value of the evaluation metric.

Optionally, the computing device is further configured to adjust the number of client computing devices used to determine the value of the evaluation metric by using a subset of the selected number of client computing devices to determine the value of the evaluation metric. Optionally, the computing device is further configured to set the number of client computing devices participating in training by maintaining the selected number of client computing devices if the second value of the evaluation metric indicates performance of the machine learning model below the threshold level, or decreasing the number of client computing devices participating in training to the number of client computing devices in the subset if the second value of the evaluation metric indicates performance of the machine learning model above the threshold level.

Optionally, the computing device is further configured to adjust the number of client computing devices used to determine the value of the evaluation metric by decreasing the number of client computing devices participating in training the machine learning model. Optionally, the computing device is further configured to cause training of the machine learning model by the decreased number of client computing devices before determining the second value of the evaluation metric. Optionally, the computing device is further configured to set the number of client computing devices participating in training by reverting to the selected number of client computing devices if the second value of the evaluation metric indicates performance of the machine learning model below the threshold level, or maintaining the decreased number of client computing devices if the second value of the evaluation metric indicates performance of the machine learning model above the threshold level.

Optionally, the computing device is further configured to cause training of the machine learning model by the selected number of client computing devices before determining the first value of the evaluation metric. Optionally, the network comprises a telecommunications network, and the plurality of client computing devices comprises a plurality of access nodes of the telecommunications network.

Optionally, the computing device is further configured to determine a resource capacity of at least one of the client computing devices, and select client computing devices to participate in training the machine learning model based on the determined resource capacities. Optionally, the computing device is further configured to determine a resource capacity of at least one of the client computing devices by predicting the resource capacity at a time in the future at which the machine learning model will be trained.

Optionally, the computing device performing the method comprises the server computing device. Optionally, the computing device performing the method comprises a plurality of computing devices. Optionally, is training the machine learning model comprises using federated learning. Optionally, the computing device is further configured to determine the first value of the evaluation metric of the machine learning model periodically.

In accordance with another aspect of the disclosure there is provided a network for training a machine learning model, the network comprising a server computing device and a plurality of client computing devices configured to perform training of the machine learning model, wherein a computing device communicatively coupled to the network is configured to select a number of the plurality of client computing devices to participate in training the machine learning model, determine a first value of an evaluation metric of the machine learning model based on the selected number of client computing devices, determine the presence of an adjustment trigger, adjust the number of client computing devices used to determine the value of the evaluation metric in response to determining the presence of the adjustment trigger, determine a second value of the evaluation metric based on the adjusted number of client computing devices, and set the number of client computing devices participating in training the machine learning model based on the second value of the evaluation metric. The computing device communicatively coupled to the network may optionally be the server computing device.

BRIEF DESCRIPTION OF THE DRAWINGS

These and other aspects, features and advantages will be apparent and elucidated from the following description of various embodiments, reference being made to the accompanying drawings, wherein.

Like reference numbers refer to like elements throughout the description.

DETAILED DESCRIPTION

The present invention will now be described more fully hereinafter. The present invention may, however, be embodied in many different forms and should not be construed as limited to the embodiments set forth herein; rather, these embodiments are provided by way of example so that this disclosure will be thorough and complete, and will fully convey the scope of the invention to those persons skilled in the relevant art.

Figure 1:
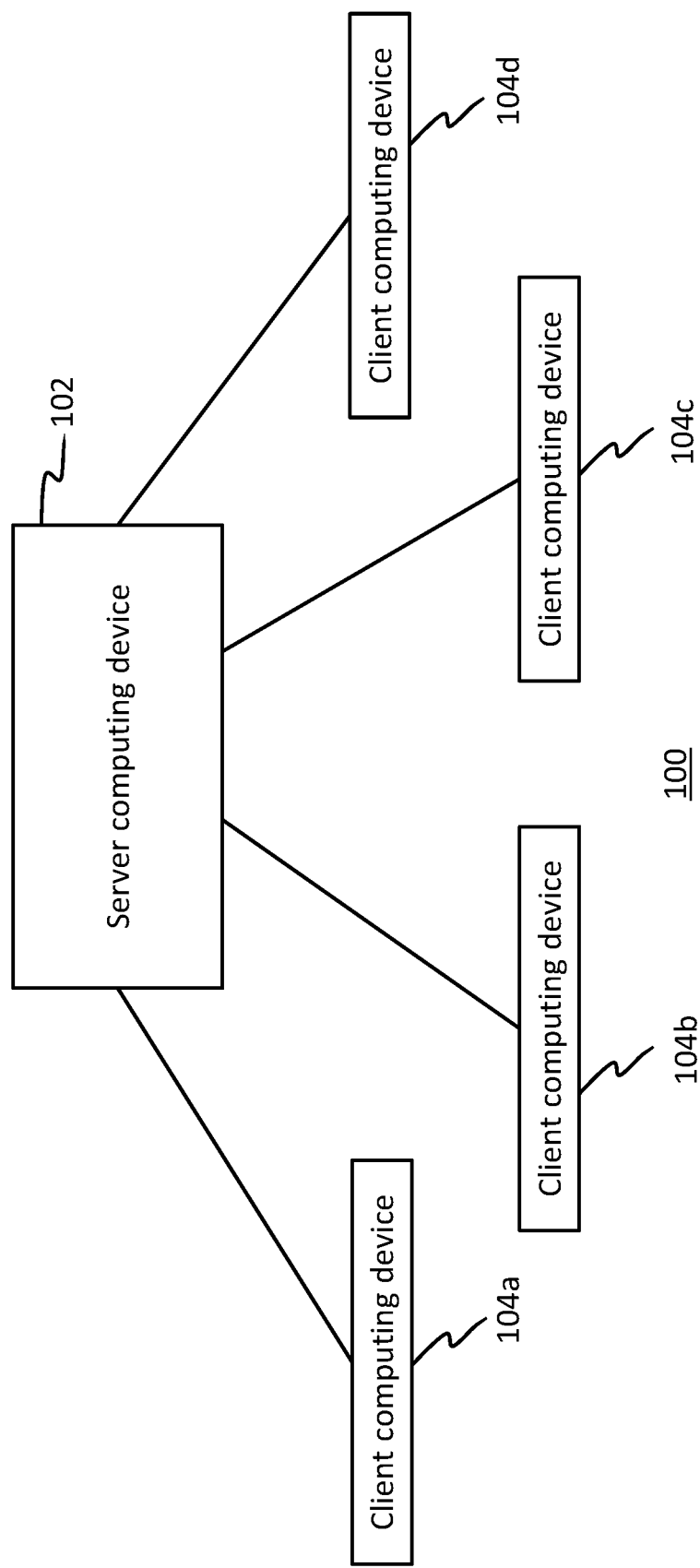
FIG. 1 shows a network for decentralised learning according to an embodiment.

With reference to FIG. 1, a network 100 for decentralised learning is shown. The system comprises a server computing device 102 and a number of client computing devices 104a-d. In some embodiments, the server computing device 102 controls and/or orchestrates the process of training a machine learning model. The client computing devices 104 participate in training the model and/or use the machine learning model in an inference stage, where learning is performed during real-world application. It will be appreciated that not all client computing devices 104 in the network 100 will necessarily use the machine learning model. Similarly, not all client computing devices 104 in the network 100 will necessarily participate in training the model. In some embodiments, a client computing device 104 may both use the model and participate in training the model. While four client computing devices 104 are shown in FIG. 1, it will be appreciated that any suitable number of client computing devices may be present in the network 100. For example, the number of client computing devices 104 in a training deployment can vary from only a handful up to tens of thousands or more. In some embodiments, the network 100 may be a telecommunications network, and the client computing devices 104 may be edge computing resources of the telecommunications network. In particular, the client computing devices 104 may be access nodes of the telecommunications network. This will be discussed in more detail in relation to FIG. 6.

In embodiments where the client computing devices 104 are controlled by the server computing device 102, i.e., all decisions about when to perform training and which client computing devices 104 should participate are performed in the server computing device 102, the network 100 is considered to be operating in a synchronous mode. In other embodiments, the client computing devices 104 decide themselves when to perform training and whether to participate. In this case, the network 100 is considered to be operating in an asynchronous mode.

The server computing device 102 and client computing devices 104 communicate with each other using a suitable communication protocol allowing them to send messages with information to each other. Examples of such a communication protocol include WebSocket and HTTP/2, although it will be envisaged that any suitable communication protocol could equally be used.

This disclosure considers two principal concerns when regarding the training of machine learning models. The first of these is to determine how many client computing devices 104 need to participate in each training round. As discussed above, the most suitable number of client computing devices 104 used to train a machine learning model is that which ensures the model is adequately trained without wasting computational resources. Essentially, what is desired is to find the minimum number of client computing devices 104 that are needed to achieve adequate performance for a particular use case. If the number of devices training the model is minimised, the remaining computational capacity of the network 100 is increased. Further, the fewer devices that participate in training, the fewer messages need to be sent between those devices and a device controlling the process, thus also saving transmission capacity of the network 100. The second concern is to determine which client computing devices 104 should participate in training each round. As not all client computing devices 104 in the network 100 need to be used to train the machine learning model, it is desirable to ensure that those devices that are selected for training are the most suitable to do so.

What constitutes an adequate performance level varies between use cases. An adequate performance can be determined using one or more evaluation metrics for the model. The evaluation metric may reflect the accuracy of the model, or some other measurable characteristic. Example evaluation metrics are the mean squared error (MSE), the mean absolute error (MAE), the Fi score, the logarithmic loss or the symmetric mean absolute percentage error (SMAPE), although other suitable evaluation metrics will be easily envisaged. As discussed above, the network 100 may be a telecommunications network. Some examples of associated use cases are link-adaptation, where the task is to adjust the modulation scheme for each UE based on the radio channel quality, bandwidth prediction, where the task is to be able to predict future bandwidth needs, beam selection where the task is to predict which beam that is most suitable for a UE, and anomaly detection to detect patterns in the data that are "non-normal".

Figure 2:
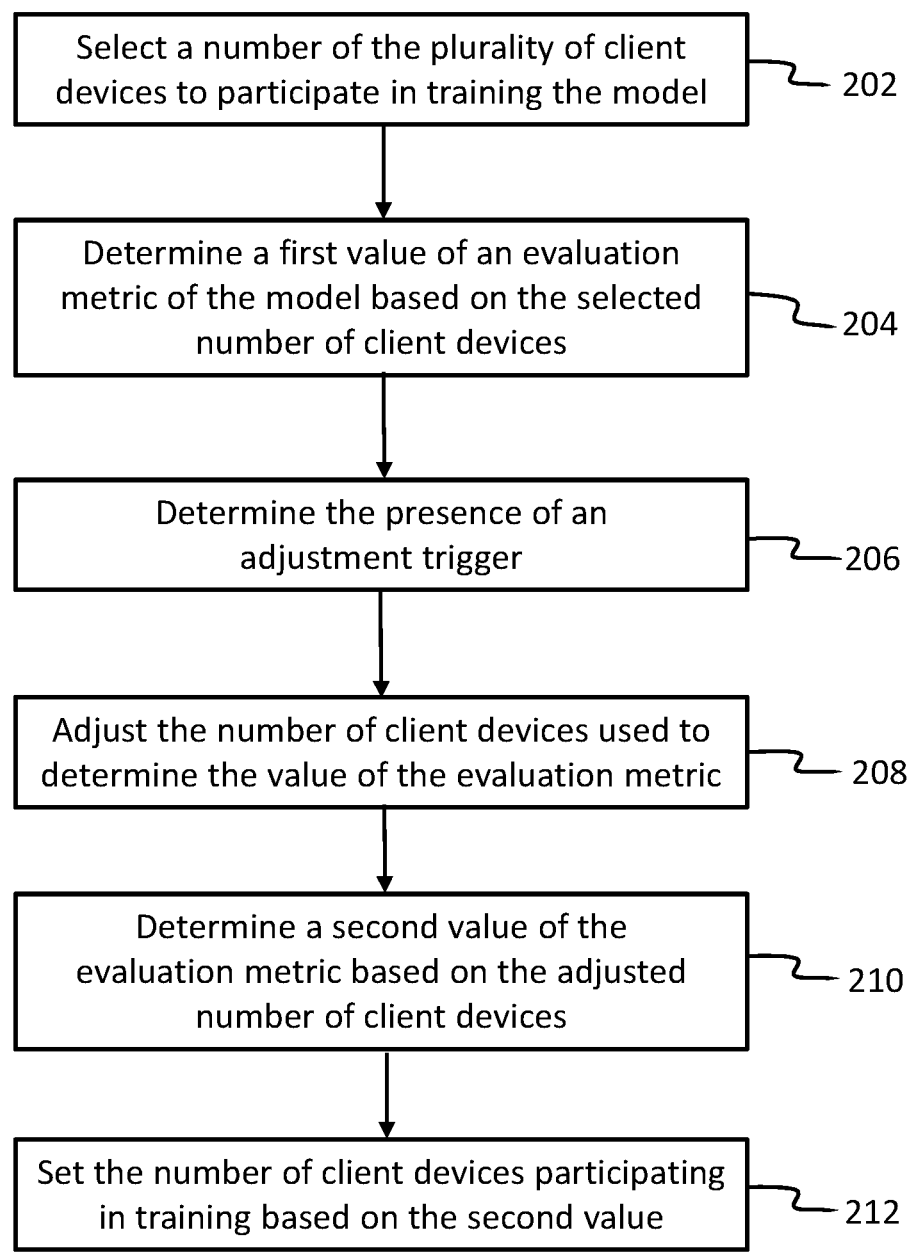
FIG. 2 shows a flow chart depicting a method of dynamically configuring a network for training a machine learning model according to an embodiment.

Referring to FIG. 2, a method 200 of dynamically configuring a network for training a machine learning model, such as network 100, is shown. The method 200 allows the number of client computing devices 104 to be adjusted to a suitable number, i.e., the minimum number of client computing devices 104 required to achieve adequate performance. The method is performed by a computing device communicatively coupled to the network 100. In some embodiments, the computing device that performs the method is the server computing device 102. As discussed above, in these embodiments the network 100 operates in synchronous mode. In some embodiments, the server computing device 102 sends initial model parameters to the client computing devices 104, which then perform training of the model locally and send evaluation indicators along with updated model parameters back to the server computing device 102. The server computing device 102 can then aggregate the parameters and sends out new, updated model parameters to the client computing devices 104 for further training. This is an example of using federated learning to train the machine learning model. In other embodiments, the computing device that performs the method 200 may be one of the client computing devices 104, or may be some other computing device communicatively coupled to the network 100. In other embodiments, a plurality of computing devices communicatively coupled to the network 100 may perform the method 200, such that the method 200 is performed in a distributed manner.

At step 202, a number of client computing devices 104 that participate in training the model is selected. The number of client computing devices 104 that participate in training may be less than the total number of client computing devices 104 present in the network 100. In some embodiments, the initial number of client computing devices 104 that participate in training is set arbitrarily. For example, the initial number may be set to 10% of the total number of client computing devices 104 in the network 100, although different scenarios may require different values. In other embodiments, the initial number may be set based on experiments performed prior to deploying the network 100 into the real world. The experiments may be based on data samples collected from the intended deployment scenario and reflecting the real data distribution. The purpose of the experiments is to find a suitable balance between the required number of client computing devices 104 and a suitable performance of the machine learning model. The determined initial number may, in some embodiments, be supplemented by an extra number of client computing devices 104 in order to provide a buffer in the case that any client computing devices 104 fail or the communication path between the client computing devices 104 and the server computing devices 102 is lossy. The initial number of client computing devices 104 is then used as a baseline when starting up the network 100. In some embodiments, computing devices outside the network 100 could also be used for training the model. For example, in the case that the network 100 is a telecommunications network, data centres outside of base stations in the telecommunications network could also be used for training.

At step 204, a first value of an evaluation metric of the machine learning model is determined based on the selected number of client computing devices 104. In some embodiments, the computing device performing the method may instruct or cause the selected number of client computing devices 104 to run the model using their local data, and feedback values of an evaluation metric. The first value of the evaluation metric can then be determined from the values returned by the client computing devices 104. As such, the first value of the evaluation metric is based on how the model performs when trained by the selected number of client computing devices 104. In some embodiments, the selected number of client computing devices 104 train the model based on an initial set of weights and return a set of updated weights to the server computing device 102. The client computing devices also send values of the evaluation metric(s), for example periodically, to the server computing device 102 or other computing device controlling the process. As such, the first evaluation metric can also be determined periodically. How often the evaluation metrics are collected is dynamically configurable and may be set by the server computing device 102. One example of a policy to use for this is to send evaluation metrics more often in the early stages of training, when the model improves a lot in each training iteration. The frequency of feedback may then decrease when the model has stabilised. If the model performance begins to degrade, the frequency of feedback may increase again. The computing device controlling the process may collect and store the evaluation metrics, both on an aggregated level but also per client. These evaluation metrics will be used when adjusting the number of clients needed during training.

At step 206, the presence of an adjustment trigger is determined. The adjustment trigger may, in some embodiments, be related to the value of the first evaluation metric of the machine learning model. For example, if the evaluation metric crosses a threshold level, from adequate performance to inadequate performance, this may constitute a trigger that the number of client computing devices 104 participating in training the model needs to be increased, as will be discussed in relation to FIG. 3. In other embodiments, an adjustment may be triggered by the passing of a predetermined period since a previous adjustment, as will be discussed in relation to FIGS. 4 and 5.

At step 208, the number of client computing devices 104 used to determine the value of the evaluation metric is adjusted in response to determining the presence of the adjustment trigger. The adjustment may be an increase or a decrease to the number of client computing devices 104 used to determine the value of the evaluation metric. The type of adjustment that is made is dependent on the type of adjustment trigger that is determined, as will be discussed in relation to FIGS. 3 to 5. In some embodiments, the number of client computing devices 104 used to train the model may be adjusted, which will in turn adjust the number of client computing devices 104 that can be used to determine the value of the evaluation metric, as will be discussed in relation to FIGS. 3 and 5. In other embodiments, the number of client computing devices 104 used to train the model may remain the same, while the number used determine the value of the evaluation metric is adjusted, as will be discussed in relation to FIG. 4.

At step 210, a second value of the evaluation metric is determined based on the adjusted number of client computing devices 104. This constitutes an updated value of the evaluation metric that shows how the model is performing based on the new number of client computing devices. In some embodiments, the second value of the evaluation metric is compared to the first the evaluation metric. In some embodiments, the second value of the evaluation metric is compared to a threshold. The threshold may or may not be the same threshold used in step 206.

At step 212, the number of client computing devices 104 participating in training the machine learning model is set based on the second value of the evaluation metric. The number may be set at an increased number relative to the initial number, a decreased number relative to the initial number, or maintained at the same level as the initial number. Which of these occurs depends on how the model performs after the adjustment, and will be discussed in more detail in relation to FIGS. 3 to 5.

The method 200 may be performed iteratively, which is to say that once the number of client computing devices 104 participating in training the machine learning model is set, at step 212, this number becomes the initial number used in step 202. In this way, the network 100 can be continuously and dynamically updated to use the most suitable number of client computing devices 104.

By regularly monitoring model performance and dynamically updating the number of client computing devices 104, the method 200 allows training of a machine learning model using the minimum number of client computing devices 104 that are needed to achieve adequate performance. This ensures that the model is trained properly without waste of computational resources or transmission capacity in the network 100. The method can adapt to changes such as data distribution changes or client computing devices 104 being added to, or removed from, the system.

Figure 3:
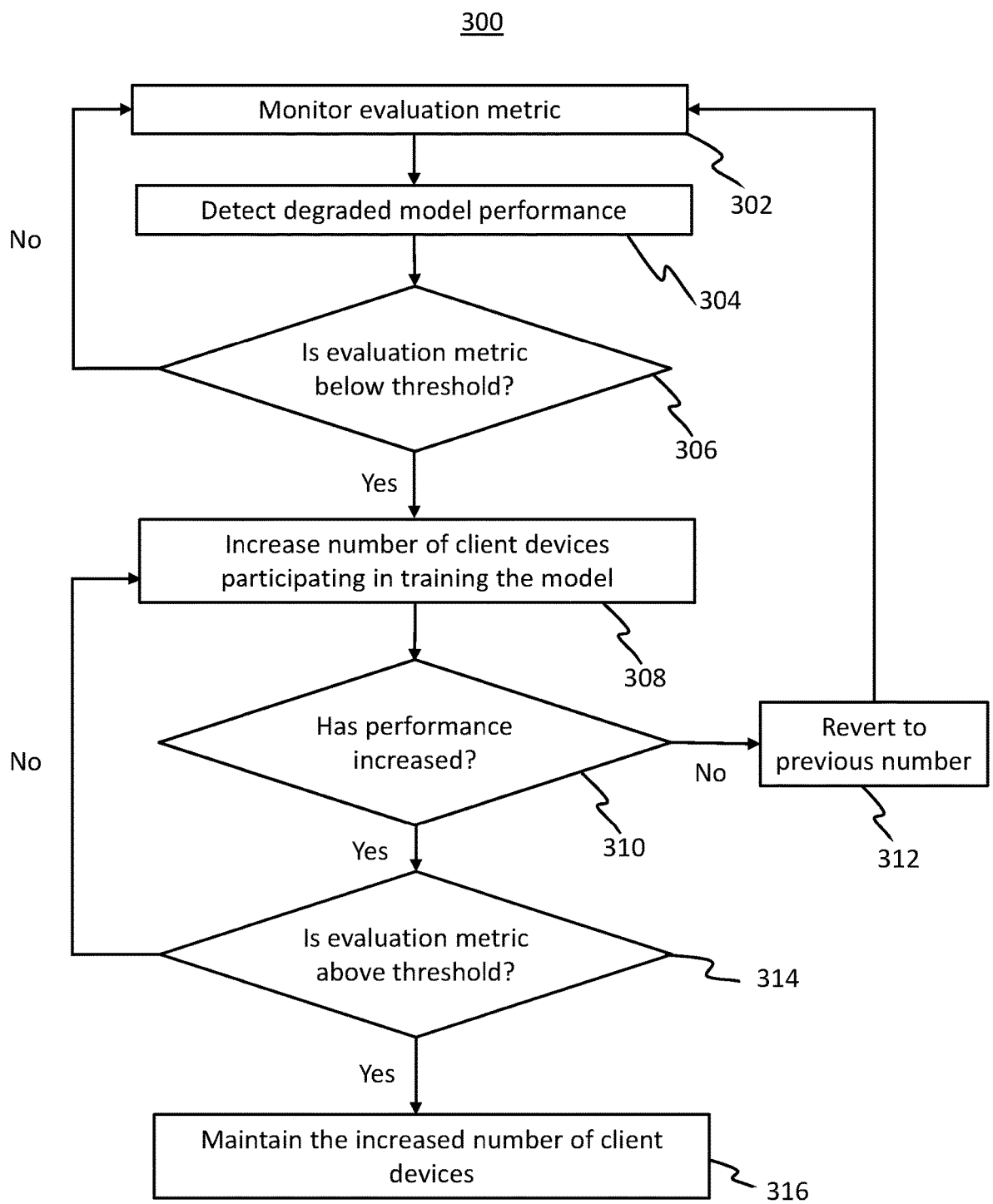
FIG. 3 shows a flow chart depicting a method of dynamically configuring a network for training a machine learning model according to another embodiment.

FIG. 3 shows a method 300 of dynamically configuring a network, such as network 100, for training a machine learning model. The method 300 is a particular embodiment of the method 200, where the adjustment performed at step 208 is an increase to the number of client computing devices 104 participating in training the model.

At step 302, a value of an evaluation metric is monitored. As discussed above, step 204 of determining the first value of the evaluation metric of the machine learning model may be performed periodically. If the model is performing adequately, then the first value of the evaluation metric will be above some predetermined performance threshold, as discussed above.

At step 304, degraded performance of the model is detected. This can be indicated by a decrease of the first value of the evaluation metric. The network 100 may then be on alert to see if the evaluation metric stays above the threshold.

At step 306, it is determined if the evaluation metric has gone below the threshold. If not, then the method 300 returns to step 302 where the value of the evaluation metric is monitored. However, if the evaluation metric is below the threshold, then the performance of the model is no longer at an adequate level. This is an example of the determination of the presence an adjustment trigger, as in step 206 of method 200.

At step 308, the number of client computing devices 104 participating in training the machine learning model is increased. This is motivated by the notion that increasing the number of client computing devices 104 will increase the performance of the model as it will have access to more training data. This is an example of an adjustment of the number of client computing devices 104 used to determine the value of the evaluation metric, as in step 208 of method 200. The machine learning model is then trained using the increased number of client computing devices 104. In some embodiments, the number of client computing devices 104 in the increase is arbitrary. I other embodiments, the number of client computing devices 104 in the increase may be based on the initial or previous number, for example an increase of 10% of the initial or previous number of client computing devices 104 participating in training the model.

The evaluation metric can then be determined based on the increased number of client computing devices 104. This is an example of determining a second value of the evaluation metric based on the adjusted number of client computing devices 104, as in step 210 of method 200. At step 310, it is determined whether the new evaluation metric indicates improved performance of the model. If there is no improvement in performance, then the method 300 moves to step 312 where the network reverts to training the model based on the previous number of client computing devices 104. This is done because, if increasing the number of client computing devices 104 training the model does not lead to an improvement in performance, then there is no need to use that many devices to train the model. It is already known that a lower number, i.e. the initial or previous number of client computing devices 104, results in the same or better performance of the model. This is an example of setting the number of client computing devices 104 at step 212 of method 200.

If, on the other hand, the value of the evaluation metric based on the increased number of client computing devices 104 does indicate an improved performance, the method 300 moves to step 314 where it is determined whether the performance is now above the threshold that was crossed at step 306. If the evaluation metric is still not above the threshold, then the method 300 returns to step 308 where the number of client computing devices 104 participating in training the machine learning model is increased. This is done because it has been shown, at step 310, that an increase in the number of client computing devices 104 participating in training the machine learning model leads to an improved performance, and it can therefore be concluded that a further increase in the number would lead to a further increase in performance. Steps 308, 310 and 314 can be looped until the evaluation metric indicates performance of the model above the threshold level. This results in the minimum number of client computing devices 104 being used to provide adequate performance of the model. If it is determined at step 314 that the performance is now above the threshold, the method 300 moves to step 316 where the increased number of client computing devices 104 is maintained. This is an example of setting the number of client computing devices 104 at step 212 of method 200.

As discussed in relation to FIG. 2, the number set at step 316 can then be used as a basis for restarting the method at step 302. The method 300 can then be continuously repeated until a stable solution is found. By regularly monitoring the model for degraded performance, and increasing the number of client computing devices 104 whenever necessary, the method 300 ensures that the machine learning model is trained adequately using the minimum number of client computing devices 104. This ensures that the model is trained properly without waste of computational resources or transmission capacity in the network 100.

Figure 4:
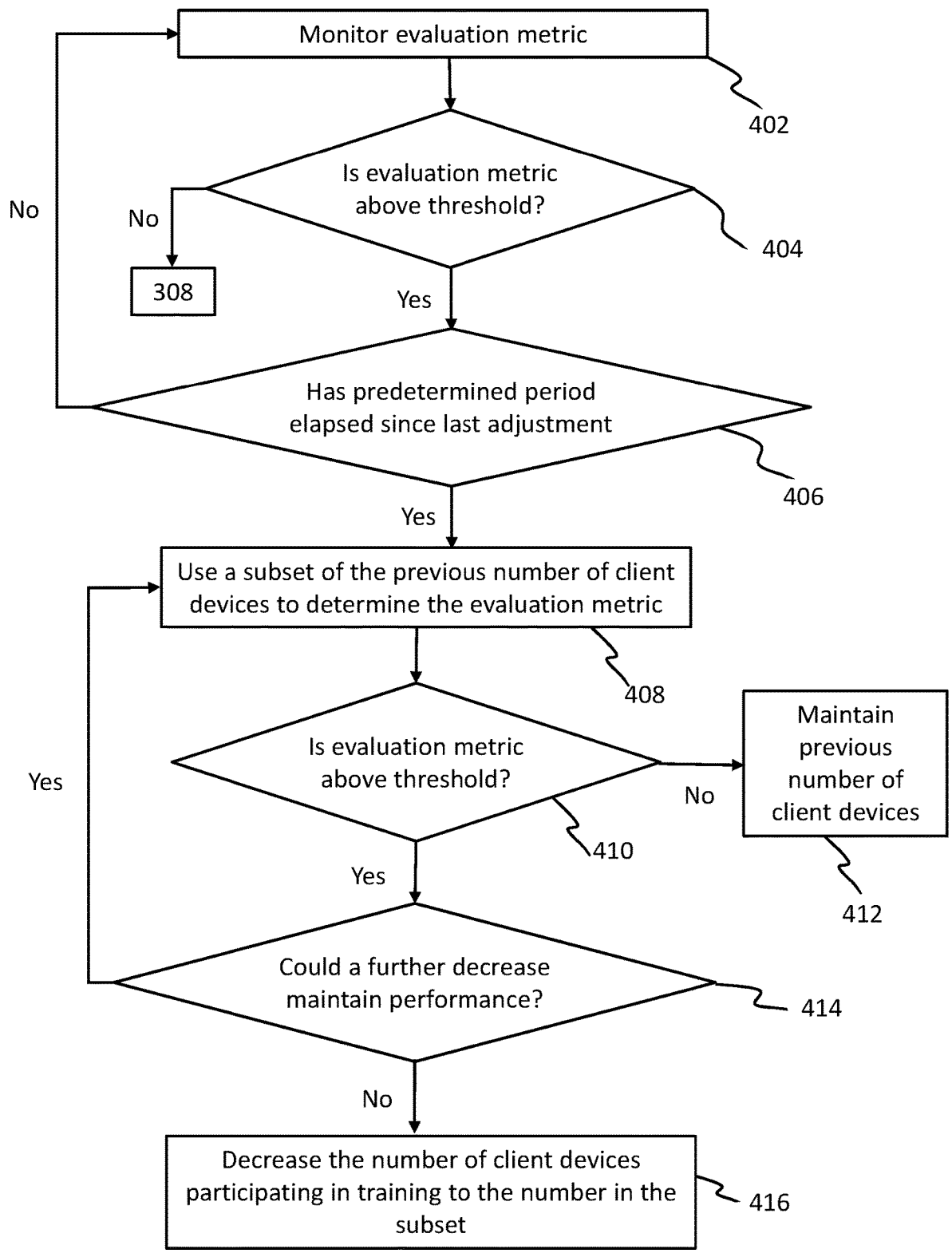
FIG. 4 shows a flow chart depicting a method of dynamically configuring a network for training a machine learning model according to another embodiment.

FIG. 4 shows another method 400 of dynamically configuring a network, such as network 100, for training a machine learning model. The method 400 is a particular embodiment of the method 200, where the adjustment performed at step 208 comprises using a subset of the number of client computing devices 104 participating in training the model to determine the evaluation metric. The goal of the method 400 is to evaluate whether it would be possible to achieve the same or an adequate level of performance but with fewer client computing devices.

At step 402, a value of an evaluation metric is monitored. This is an example of determining a value of the evaluation metric, as in step 204 of method 200. As discussed above, step 204 of determining the first value of the evaluation metric of the machine learning model may be performed periodically. If the model is performing adequately, then the first value of the evaluation metric will be above some predetermined performance threshold, as discussed above.

At step 404, it is determined if the evaluation metric is above the threshold. If not, then the method 400 moves to step 308 of method 300 where appropriate action can be taken, as discussed above. However, if the evaluation metric is above the threshold, the method moves to step 406, where it is determined if a predetermined period has passed since a previous adjustment to the number of client computing devices 104 used to determine the value of the evaluation metric. This is an example of the determination of the presence an adjustment trigger, as in step 206 of method 200. By using a predetermined period to trigger an adjustment, it is ensured that, when a model is performing adequately, the network 100 is not merely left to run at a set level, but any possibility to increase the efficiency of training is regularly investigated.

If, at step 406, it is determined that a predetermined period has not passed since a previous adjustment, the method returns to step 402 where the value of the evaluation metric continues to be monitored. If, however, a predetermined period has passed, then the method 400 moves to step 408 where a subset of the number of client computing devices 104 participating in training are used to determine the evaluation metric. This is an example of an adjustment of the number of client computing devices 104 used to determine the value of the evaluation metric, as in step 208 of method 200.

To perform this task, the computing device performing the method makes use of the weight updates and evaluation results collected from all client computing devices 104 participating in training. However, instead of evaluating the model performance for all client computing devices 104, the server samples the client computing devices 104 and creates a subset of client computing devices 104, including their weight updates and evaluation results. A new model is then created based only on the subset of client computing devices 104. In some embodiments, a number of subsets and associated models may be created. In one example, two new models are created based on two different subsets of client computing devices 104. The first new model uses 90% of the available training results, and the second new model uses 80% of the available training results. Meanwhile, the method continues to train the model based on the initial number (100%) of client computing devices 104.

At step 410, it is determined whether the new evaluation metric indicates performance of the model above the threshold. In the example above, the new models are evaluated on a number of the client computing devices 104 using their local data and the results of the evaluation are collected. In some embodiments, all client computing devices 104 used to determine the evaluation metric at step 402 are used to evaluate the new models. This will provide a more reliable comparison between the various models. Alternatively, the new models may be evaluated on a fewer of the client computing devices 104, for example, a sample of client computing devices 104 that is considered to represent the number used in step 402. In some embodiments, a minimum number of client computing devices 104 used for evaluating the new models can be set, to ensure proper and reliable evaluation of the new models.

In this example, there are now three different evaluation results that can be compared—one with 100% of the available training results (the original model), one with 90% and one with 80%. This is an example of determining a second value of the evaluation metric based on the adjusted number of client computing devices 104, as in step 210 of method 200.

If the value of the evaluation metric based on the subset indicates performance of the model below the threshold, then the method 400 moves to step 412 where the network reverts to training the model based on the previous number of client computing devices 104. In the example above, if the results of both new models are below the determined level of adequate performance, then the models are discarded and the current number of client computing devices 104 is kept at the same level as before. This is done because determining the performance of the model based on the subsets of client computing devices 104 has indicated an unacceptable degradation of the performance of the model, and so it is not possible to decrease the number of client computing devices 104 training the model without compromising performance. This is an example of setting the number of client computing devices 104 at step 212 of method 200.

If, on the other hand, the value of the evaluation metric based on the subset indicates performance of the model above the threshold, the method moves to step 414 where it is determined if a further decrease could maintain adequate performance. The decision about whether a further decrease is performed could be based on a number of factors, for example how well the previous model was performing relative to the threshold or whether the cost of evaluating another model is detrimental to overall performance and/or efficiency of the network 100. If it is determined that a further decrease could maintain adequate performance, then the method 400 returns to step 408 where a smaller subset of the number of client computing devices 104 participating in training are used to determine the evaluation metric. In the example above, if the model at 80% indicates adequate performance, a new model at 70% may be tested. This is done because it has been shown, at step 410, that a decrease in the number of client computing devices 104 participating in training the machine learning model maintains an adequate performance with reduced use of computational resources, and it can therefore be determined whether a further decrease would maintain an adequate performance with even further reduction of computational resource usage. Steps 408, 410 and 414 can be looped until the evaluation metric indicates performance of the model below the threshold level. This results in the minimum number of client computing devices 104 being used to provide adequate performance of the model.

If it is determined at step 414 that a further decrease could not maintain adequate performance, the method 400 moves to step 416 where the number of client computing devices 104 in the subset is adopted as the number of devices used to participate in training the model. In the example above, if one of the new models achieves adequate performance, then the number of clients is reduced to that level. This is an example of setting the number of client computing devices 104 at step 212 of method 200.

By regularly monitoring model performance and decreasing the number of client computing devices 104 where possible, the method 400 allows training of a machine learning model to an adequate level using the minimum number of client computing devices 104. This ensures that the model is trained properly without waste of computational resources or transmission capacity in the network 100.

Figure 5:
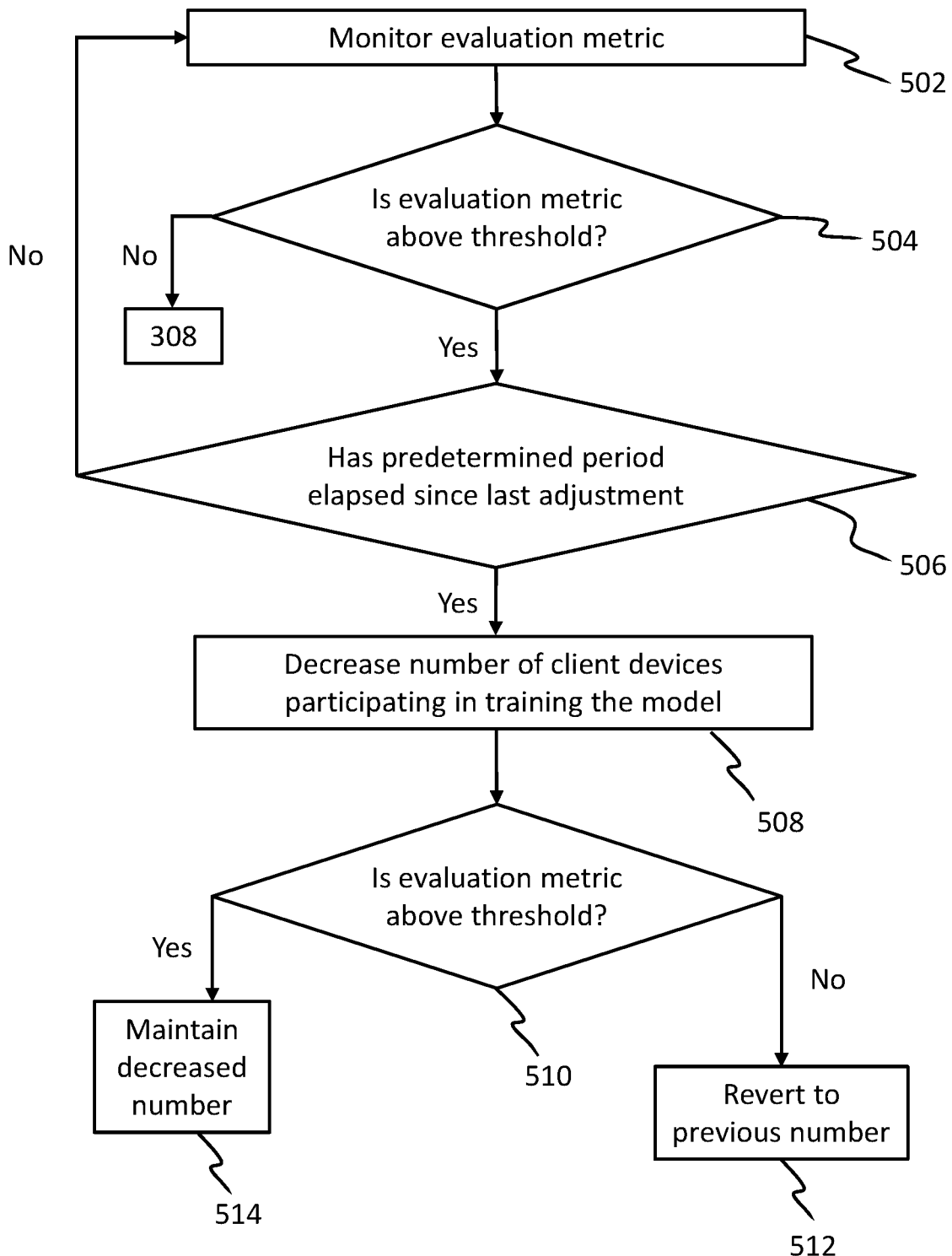
FIG. 5 shows a flow chart depicting a method of dynamically configuring a network for training a machine learning model according to another embodiment.

FIG. 5 shows a method 500 of dynamically configuring a network, such as network 100, for training a machine learning model. The method 500 is a particular embodiment of the method 200, where the adjustment performed at step 208 is a decrease to the number of client computing devices 104 participating in training the model. As such, the method 500 differs from the method 400 of FIG. 4 in how the adjustment is performed at step 208 of the method 200 is performed. The goal of the method 500 is to evaluate whether it would be possible to achieve the same or an adequate level of performance but with fewer client computing devices.

At step 502, a value of an evaluation metric is monitored. This is an example of determining a value of the evaluation metric, as in step 204 of method 200. As discussed above, step 204 of determining the first value of the evaluation metric of the machine learning model may be performed periodically. If the model is performing adequately, then the first value of the evaluation metric will be above some predetermined performance threshold, as discussed above.

At step 504, it is determined if the evaluation metric is above the threshold. If not, then the method 500 moves to step 308 of method 300 where appropriate action can be taken, as discussed above. However, if the evaluation metric is above the threshold, the method moves to step 506, where it is determined if a predetermined period has passed since a previous adjustment to the number of client computing devices 104 used to determine the value of the evaluation metric. This is an example of the determination of the presence an adjustment trigger, as in step 206 of method 200. As discussed above, by using a predetermined period to trigger an adjustment, it is ensured that, when a model is performing adequately, the network 100 is not merely left to run at a set level, but any possibility to increase the efficiency is regularly investigated.

If, at step 506, it is determined that a predetermined period has not passed since a previous adjustment, the method returns to step 502 where the value of the evaluation metric is monitored. If, however, a predetermined period has passed, then the method 500 moves to step 508 where the number of client computing devices 104 participating in training the machine learning model is decreased. This is different from the method 400 of FIG. 4, where the number of client computing devices 104 participating in training the machine learning model stays the same, but a subset is sampled for further evaluation. The decrease at step 508 is motivated by the desire to reduce the total computational resource used to train the model as much as possible. The machine learning model is then trained using the decreased number of client computing devices 104. This is an example of an adjustment of the number of client computing devices 104 used to determine the value of the evaluation metric, as in step 208 of method 200.

The evaluation metric can then be determined based on the decreased number of client computing devices 104. This is an example of determining a second value of the evaluation metric based on the adjusted number of client computing devices 104, as in step 210 of method 200. At step 510, it is determined whether the new evaluation metric indicates performance of the model above the threshold. If not, then the method 500 moves to step 512, where the network reverts to training the model based on the previous number of client computing devices 104. This is an example of setting the number of client computing devices 104 at step 212 of method 200. This is because it has been found that decreasing the number of client computing devices 104 training the model leads to inadequate performance of the model.

If, on the other hand, the value of the evaluation metric based on the increased number of client computing devices 104 indicates performance of the model above the threshold, the method 300 moves to step 514 where the decreased number of client computing devices 104 is maintained. This is an example of setting the number of client computing devices 104 at step 212 of method 200.

By regularly monitoring model performance and decreasing the number of client computing devices 104 where possible, the method 400 allows training of a machine learning model to an adequate level using the minimum number of client computing devices 104. This ensures that the model is trained properly without waste of computational resources or transmission capacity in the network 100.

The methods shown in FIGS. 2 to 5 are directed at determining the minimum number of client computing devices 104 that are needed to achieve adequate performance of a machine learning model. Once the number of client computing devices 104 to participate in training the model has been defined, it is advantageous to determine which of the client computing devices 104 in the network 100 should be used to make up that number.

Whilst the devices could be selected randomly, or systematically (for example selecting every $10^{th}$ device, if 10% of the total number of client computing devices 104 are required), it may be more suitable to select devices based on their individual resources. For example, client computing devices 104 with increased computing capacity will be able to train the model more quickly than other devices. Computing capacity of a client computing device 104 may be related to the availability of capacity (how much of the device's total capacity is available at a given moment in time), storage capacity (the capacity to store data, for example training samples), memory availability (whether it is possible to load all necessary data into a memory of the device to enable faster training) and/or the presence of additional accelerators (such as an "AI chip" to speed up computations) as well as other parameters known in the art. Similarly, client computing devices 104 with larger bandwidth connections to the server computing device 102 will be able to communicate model parameters more quickly than other devices. The client computing devices with the most suitable resources for training the model may therefore be selected. This is quite a straightforward process in the case when all client computing devices 104 are candidates to participate in training. In reality, however, this is very seldom true due to the fact that some client computing devices 104 will have limited resources to participate in training during certain time periods.

In some cases, the decision on whether a client computing device 104 can participate in training is binary (yes or no) as it simply may not have the capability to do any training at all. In these cases, the client computing device 104 sends a "no" message to the server computing device 102, or other computing device controlling the process, indicating that the client computing device 104 cannot participate in model training. Other client computing devices 104 may know beforehand that they have the capability to participate in training and can simply send a "yes" message. In some embodiments, this is handled in an initial registration process when a new client computing device 104 connects to the network 100. In other embodiments, a client computing device 104 may only be able to participate in training at some points in time. In this case, a client computing device 104 may monitor its own resources. This includes current usage and currently available resources. In these cases, messages may be sent periodically such that current values of resource capacity, or the most recently received values of resource capacity, may be used to determine availability of client computing devices. Regardless of its availability to participate in training, a client computing device 104 may still be interested in using the model and may indicate this accordingly.

In some embodiments, determining the resource capacity of client computing devices 104 involves predicting the resource capacity at a time in the future at which the machine learning model will be trained. In this case, a client computing device 104 may communicate its resource availability and this information is fed into a prediction model that outputs predicted usage and predicted available resources. In the example of a telecommunications network, temporal behaviour in a base station is quite predictable and follows a certain daily pattern based on user location and usage. This includes typical busy hour patterns with high peaks around, e.g., noon and lower traffic volumes during the night.

Client computing devices 104 may also, based on previous machine learning model training (monitored and stored during training), know how much resource is needed for training and for how long. Typical values for this can also be received from the server computing device 102, or other computing device controlling the process, during start-up when this information can be collected from all client computing devices 104 in the network 100. If the difference between a maximum capacity of the client computing device 104 and the predicted usage for training a model is large during a certain time period for training, then the client computing device 104 will send a message to indicating that it will be available for training during that time period.

The server computing device 102, or other computing device controlling the process, may store information on all client computing devices 104 relating to which timeslots they are available for training. This information can be used as a policy to decide which client computing devices 104 should participate in training. If a large number of client computing devices 104 available, the selection can be made by randomising among all devices that are available, prioritising devices that are available for longer time, and/or prioritising devices that have highest level of available resources.

Once the number of client computing devices 104 to participate in training the model has been defined, and it has been determined which of the client computing devices 104 in the network 100 should be used to make up that number, the server computing device 102, or other computing device controlling the process, sends a message to the selected devices instructing them to train the model and when it is time to do training. It will be envisaged that this could also be performed when an initial number of client computing devices 104 is selected during the setup of the network, for example at step 202 of method 200.

The methods discussed above allow the number of client devices used for training a machine learning model to be dynamically adjusted, and also enable determination of which devices should be used where a number of client devices are available. The disclosed methods can detect when the performance of a model is below an acceptable level. This detection will trigger evaluation of a case where a different number of devices are used in training and any necessary adjustment to the number can then be made. This ensures that a minimum number of client devices is used to train a machine learning model, such that the model is adequately trained without wasting computational resources or transmission capacity. The system can adapt to changes such as data distribution changes or client devices being added to, or removed from, the system. Furthermore, it can be ensured that those devices selected for training are the most suitable to do so.

As discussed above, the network 100 may be a telecommunications network, where the client computing devices 104 are edge computing resources of the telecommunications network. In particular, the client computing devices 104 may be access nodes of the telecommunications network. One benefit of using a decentralised learning approached in a telecommunications network is that base stations can communicate with each other to train the model, and transmission costs associated with sending data centrally are avoided.

Figure 6:
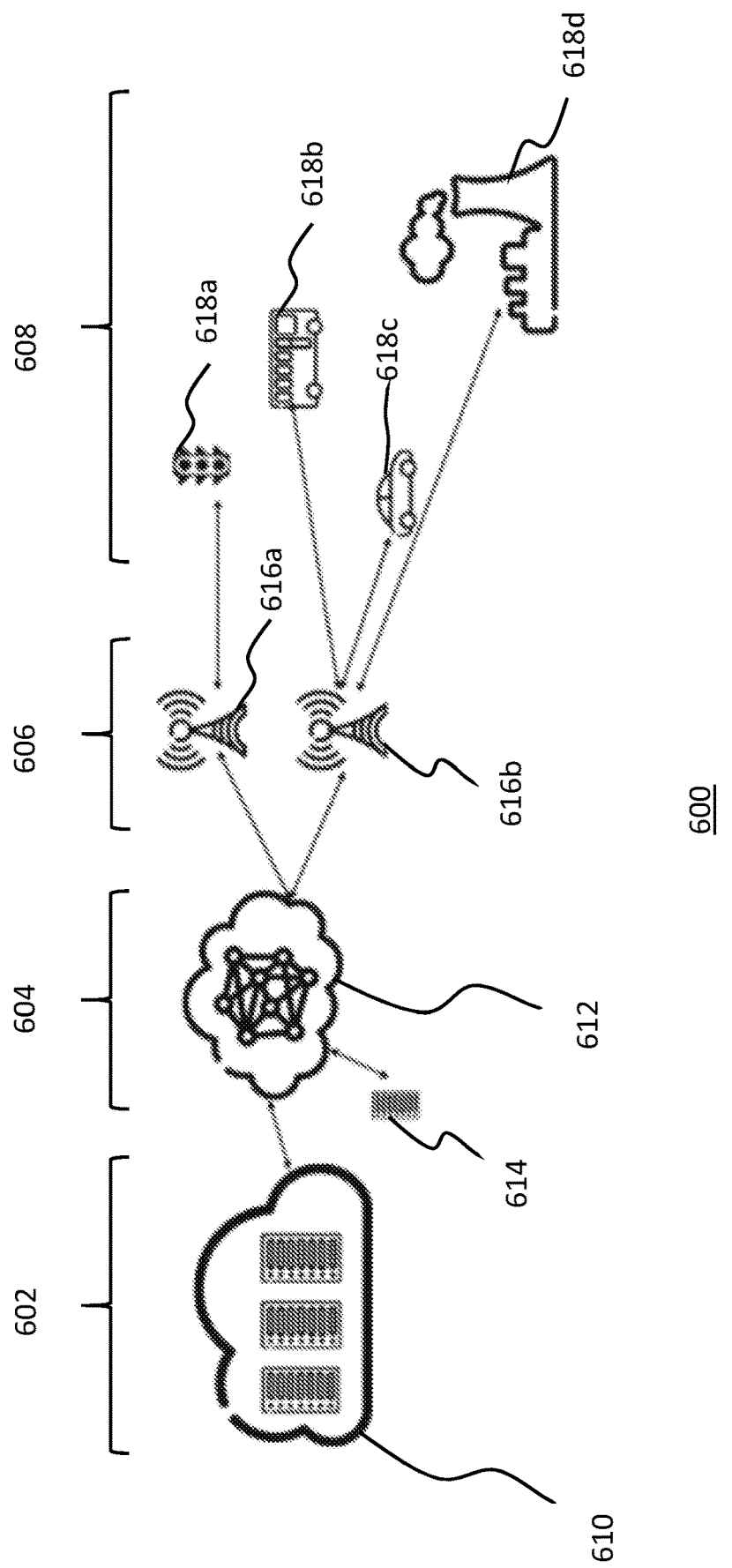
FIG. 6 shows a schematic view of a communication system according to the disclosure.

An example communication system 600 is shown in FIG. 6. The communication system 600 is a distributed system, such that parts of the system are implemented in a cloud 602, a fog 204, an edge 606 and a user equipment layer 608.

The cloud 602 comprises a host computer 610 implemented as a cloud-implemented server. In other embodiments, the host computer may be embodied in the hardware and/or software of a standalone server, a distributed server or as processing resources in a server farm. The host computer 610 may be under the ownership or control of a service provider, or may be operated by the service provider or on behalf of the service provider.

The host computer 610 comprises hardware configured to set up and maintain a wired or wireless connection with an interface of a different communication device of the communication system 600. The host computer 610 may further comprise processing circuitry, which may have storage and/or processing capabilities. In particular, the processing circuitry may comprise one or more programmable processors, application-specific integrated circuits, field programmable gate arrays or combinations of these (not shown) adapted to execute instructions. The host computer 610 further comprises software, which is stored in or accessible by the host computer 610 and executable by the processing circuitry. The software includes a host application. The host application may be operable to provide a service to a remote user, for example a user connecting via an over the top (OTT) connection. In providing the service to the remote user, the host application may provide user data which is transmitted using the OTT connection.

The fog 604 is implemented between the cloud 602 and the edge 606, and may comprise a core network 612. The core network 612 may be a 3GPP-type cellular network. The fog 604 may also comprise a fog computer 614. Connections between the host computer 610 and the core network 612 may extend directly from the host computer 610 to the core network 612 and/or the fog computer 614, or may go via an optional intermediate network (not shown). The intermediate network may be one of, or a combination of more than one of, a public, private or hosted network; the intermediate network, if any, may be a backbone network or the Internet; in particular, the intermediate network may comprise two or more sub-networks (not shown). The fog computer 614 may be considered part of the core network 612, or separate from the core network 612 for example operated and handled by an entity different from the telecom network operator.

The edge 606 comprises a number of base stations 616a, 616b. Base stations may also be called access nodes. The base stations may be implemented in an access network. The base stations 616 comprise hardware enabling them to communicate with the core network 612, and via the core network 612 with the host computer 610. The base stations 616 also comprises hardware enabling them to communicate with the user equipment (UE) 618 located in the user equipment layer 608. Each base station 616 is configured to set up and maintain a wired or wireless connection with an interface of a different communication device of the communication system 600, for example a UE 618 located in a coverage area (not shown in FIG. 6) served by the base station. Each base station 616 may also be configured to facilitate a connection to the host computer 610. The connection may be direct or it may pass through the core network 612 and/or through one or more intermediate networks outside the communication system 600. Each base station 616 may comprise one or more programmable processors, application-specific integrated circuits, field programmable gate arrays or combinations of these (not shown) adapted to execute instructions. Each base station 616 further has software stored internally or accessible via an external connection.

The user equipment layer 608 comprises a number of user equipment elements 618. In FIG. 6, a first UE 618a is wirelessly connectable to, or configured to be paged by, a corresponding base station 616a. A second UE 618b, third UE 618c and fourth UE 618d are wirelessly connectable to a corresponding base station 616b. While a plurality of UEs 618 are illustrated in this example, the disclosed embodiments are equally applicable to a situation where a sole UE is in the coverage area or where a sole UE 618 is connecting to a corresponding base station 616.

Each UE 618 may include a radio interface configured to set up and maintain a wireless connection with a base station 616 serving a coverage area in which the UE 618 is currently located. The hardware of the UE 618 further includes processing circuitry, which may comprise one or more programmable processors, application-specific integrated circuits, field programmable gate arrays or combinations of these (not shown) adapted to execute instructions. Each UE 618 further comprises software, which is stored in or accessible by the UE 618 and executable by the processing circuitry. The software may include a client application operable to provide a service to a human or non-human user via the UE 618, with the support of the host computer 610. In the host computer 610, an executing host application may communicate with the executing client application via the OTT connection, or via other connections, terminating at the UE 618 and the host computer 610. In providing the service to the user, the client application may exchange user data (also referred to as application data, or data) with the host application. The OTT connection, or other connection, may transfer the user data. The client application may interact with the user to generate the user data that it provides. Example UEs 618 are mobile telephones, smartphones, tablets, laptops, and internet of things (IoT) devices such as connected sensors, meters etc. The UEs in the present context may be, for example, permanently or temporarily mounted on equipment (containers, etc.) or a fixed structure (wall, roof, etc.), portable, pocket-storable, hand-held, computer-comprised, wearable and/or vehicle-mounted mobile devices, just to mention a few examples. The UEs 618 are also commonly referred to as, communication devices, wireless devices, wireless terminals, mobile terminals, mobile stations, user equipment (UE), mobile telephones, cellular telephones, etc. These terms can typically be regarded as synonyms, but some of them are also in some contexts used to denote a communication device in relation to a specific telecom standard, but the latter aspect is not of importance in the present context.

The communication system 600 of FIG. 6 as a whole enables connectivity between one of the connected UEs 618 and the host computer 610. The host computer 610 and the connected UEs 618 are configured to communicate data using the access network, the core network 612, any intermediate network and possible further infrastructure (not shown) as intermediaries. In the case of an OTT connection, or other connection, the connection may be transparent in the sense that the participating communication devices through which the OTT connection, or other connection, passes are unaware of routing of uplink and downlink communications. For example, a base station 616 may not or need not be informed about the past routing of an incoming downlink communication with data originating from a host computer 610 to be forwarded (e.g., handed over) to a connected UE 618. Similarly, the base station 616 need not be aware of the future routing of an outgoing uplink communication originating from the UE 618 towards the host computer 610.

Figure 7:
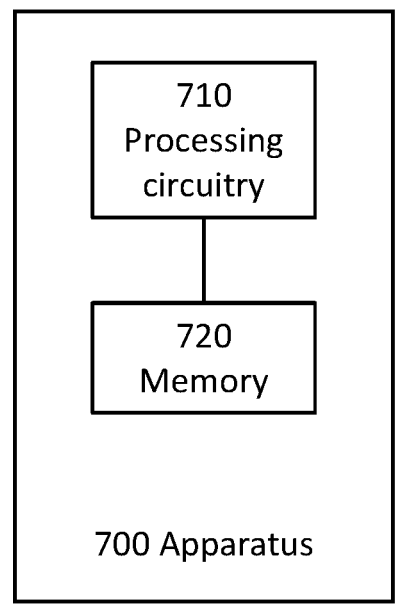
FIG. 7 shows an example implementation of an apparatus.

FIG. 7 discloses an example implementation of an apparatus 700, which may be configured to perform the above-mentioned method. As discussed above, this may be one of the computing devices in the network 100, for example a server computing device 102 or a client computing device 104 of the network 100.

The apparatus 700 may comprise a processor, or a processing circuitry 710, and a memory, or a memory circuitry 720. The memory circuitry 720 may store computer program code which, when run in the processing circuitry 710, may cause the apparatus 700 to perform the method 500. In one exemplary embodiment, the computer program code, when run in the processing circuitry 710, may cause the apparatus 700 to determine the trajectory of a wireless communication device located within a first cell of the cellular network. The apparatus 700 may then be caused to identify at least one second cell of the cellular network towards which the trajectory leads. Thereafter, the apparatus 700 is caused to cause allocation of resources at one or more edge computing devices associated with the at least one second cell to enable migration of computing information from an edge computing device associated with the first cell to the one or more edge computing devices associated with the at least one second cell.

In some embodiments, the memory circuitry 720 may store computer program code which, when run in the processing circuitry 710, may cause the apparatus 700 to determine the trajectory of the wireless communication device based on a beam/signal strength of the wireless communication device relative to at least one access node of the network. In some embodiments, the memory circuitry 720 may store computer program code which, when run in the processing circuitry 710, may cause the apparatus 700 to determine the trajectory of the wireless communication device based on positioning information from a massive MIMO antenna.

In some embodiments, the memory circuitry 720 may store computer program code which, when run in the processing circuitry 710, may cause the apparatus 700 to cause allocation of resources comprising configuring at least one of compute capacity, storage capacity, connectivity, and/or radio capacity of the edge computing device associated with the at least one second cell. In some embodiments, the memory circuitry 720 may store computer program code which, when run in the processing circuitry 710, may cause the apparatus 700 to complete the allocation of resources before the wireless communication device leaves the first cell.

In some embodiments, the memory circuitry 720 may store computer program code which, when run in the processing circuitry 710, may cause the apparatus 700 to migrate computing information from the edge computing device associated with the first cell to an edge computing device associated with a destination cell of the at least one second cells. In some embodiments, the memory circuitry 720 may store computer program code which, when run in the processing circuitry 710, may cause the apparatus 700 to migrate computing information from an edge computing device of the first cell to an edge computing device of the destination cell.

The terminology used herein is for the purpose of describing particular embodiments only and is not intended to be limiting. As used herein, the singular forms "a", "an" and The are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood. It will be further understood that terms used herein should be interpreted as having a meaning that is consistent with their meaning in the context of this specification and the relevant art and will not be interpreted in an idealised or overly formal sense unless expressly so defined herein.

Modifications and other variants of the described embodiments will come to mind to one skilled in the art having benefit of the teachings presented in the foregoing description and associated drawings. Therefore, it is to be understood that the embodiments are not limited to the specific example embodiments described in this disclosure and that modifications and other variants are intended to be included within the scope of this disclosure. Furthermore, although specific terms may be employed herein, they are used in a generic and descriptive sense only and not for purposes of limitation. Therefore, a person skilled in the art would recognise numerous variations to the described embodiments that would still fall within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality.

The invention claimed is:

1. A computing device for dynamically configuring a network for training a machine learning model, the network comprising a server computing device and a plurality of client computing devices configured to perform training of the machine learning model, the computing device communicatively coupled to the network and comprising processing circuitry and a memory, the memory containing instructions executable by the processing circuitry to configure the computing device to:
    select a number of the plurality of client computing devices to participate in training the machine learning model via federated learning;
    determine a first value of an evaluation metric of the machine learning model based on the selected number of client computing devices;
    indicate degraded performance of the machine learning model in response to comparing the first value of the evaluation metric to a threshold level;
    determine the presence of an adjustment trigger;
    adjust the number of client computing devices that participate in training the machine learning model in response to determining the presence of the adjustment trigger;
    determine a second value of the evaluation metric based on the adjusted number of client computing devices;
    set the number of client computing devices participating in training the machine learning model based on the second value of the evaluation metric; and
    revert to the selected number of the plurality of client computing devices in response to comparing the second value of the evaluation metric to the first value of the evaluation metric.

2. The computing device of claim 1, further configured to:
    determine the presence of an adjustment trigger by determining that the first value of the evaluation metric indicates performance of the machine learning model below a threshold level; and
    adjust the number of client computing devices used to determine the value of the evaluation metric by increasing the number of client computing devices participating in training the machine learning model.

3. The computing device of claim 2, further configured to cause training of the machine learning model by the increased number of client computing devices before determining the second value of the evaluation metric.

4. The computing device of claim 2, further configured to set the number of client computing devices participating in training by one of:
    reverting to the selected number of client computing devices if the second value of the evaluation metric is the same as or less than the first value of the evaluation metric;
    maintaining the increased number of client computing devices if the second value of the evaluation metric indicates performance of the machine learning model above the threshold level; and
    further increasing the number of client computing devices participating in training the machine learning model if the second value of the evaluation metric indicates performance of the machine learning model above the first value of the evaluation metric and below the threshold level.

5. The computing device of claim 1, further configured to determine the presence of an adjustment trigger by:
    determining that the first value of the evaluation metric indicates performance of the machine learning model above a threshold level; and
    determining that a predetermined period has passed since a previous adjustment to the number of client computing devices used to determine the value of the evaluation metric.

6. The computing device of claim 5, further configured to adjust the number of client computing devices used to determine the value of the evaluation metric by using a subset of the selected number of client computing devices to determine the value of the evaluation metric.

7. The computing device of claim 5, further configured to set the number of client computing devices participating in training by one of:
    maintaining the selected number of client computing devices if the second value of the evaluation metric indicates performance of the machine learning model below the threshold level; and
    decreasing the number of client computing devices participating in training to the number of client computing devices in the subset if the second value of the evaluation metric indicates performance of the machine learning model above the threshold level.

8. The computing device of claim 5, further configured to adjust the number of client computing devices used to determine the value of the evaluation metric by decreasing the number of client computing devices participating in training the machine learning model.

9. The computing device of claim 8, further configured to cause training of the machine learning model by the decreased number of client computing devices before determining the second value of the evaluation metric.

10. The computing device of claim 8, further configured to set the number of client computing devices participating in training by one of:
    reverting to the selected number of client computing devices if the second value of the evaluation metric indicates performance of the machine learning model below the threshold level; and
    maintaining the decreased number of client computing devices if the second value of the evaluation metric indicates performance of the machine learning model above the threshold level.

11. The computing device of claim 1, further configured to cause training of the machine learning model by the selected number of client computing devices before determining the first value of the evaluation metric.

12. The computing device of claim 1, wherein:
the network comprises a telecommunications network; and
the plurality of client computing devices comprises a plurality of access nodes of the telecommunications network.

13. The computing device of claim 1, further configured to:
determine a resource capacity of at least one of the client computing devices; and
select client computing devices to participate in training the machine learning model based on the determined resource capacities.

14. The computing device of claim 13, further configured to determine a resource capacity of at least one of the client computing devices by predicting the resource capacity at a time in the future at which the machine learning model will be trained.

15. The computing device of claim 1, wherein the computing device performing the method comprises the server computing device.

16. The computing device of claim 1, wherein the computing device performing the method comprises a plurality of computing devices.

17. The computing device of claim 1, further configured to determine the first value of the evaluation metric of the machine learning model periodically.

18. A computer storage medium having stored thereon a computer program comprising instructions which, when executed on processing circuitry, causes the processing circuitry to perform method for dynamically configuring a network for training a machine learning model, the network comprising a server computing device and a plurality of client computing devices configured to perform training of the machine learning model, the method comprising:
selecting a number of the plurality of client computing devices to participate in training the machine learning model via federated learning;
determining a first value of an evaluation metric of the machine learning model based on the selected number of client computing devices;
indicating degraded performance of the machine learning model in response to comparing the first value of the evaluation metric to a threshold level;
determining the presence of an adjustment trigger;
adjusting the number of client computing devices that participate in training the machine learning model in response to determining the presence of the adjustment trigger;
determining a second value of the evaluation metric based on the adjusted number of client computing devices;
setting the number of client computing devices participating in training the machine learning model based on the second value of the evaluation metric; and
reverting to the selected number of the plurality of client computing devices in response to comparing the second value of the evaluation metric to the first value of the evaluation metric.

19. A method for dynamically configuring a network for training a machine learning model, the network comprising a server computing device and a plurality of client computing devices configured to perform training of the machine learning model, the method performed at a computing device communicatively coupled to the network and comprising:
selecting a number of the plurality of client computing devices to participate in training the machine learning model via federated learning;
determining a first value of an evaluation metric of the machine learning model based on the selected number of client computing devices;
indicating degraded performance of the machine learning model in response to comparing the first value of the evaluation metric to a threshold level;
determining the presence of an adjustment trigger;
adjusting the number of client computing devices that participate in training the machine learning model in response to determining the presence of the adjustment trigger;
determining a second value of the evaluation metric based on the adjusted number of client computing devices;
setting the number of client computing devices participating in training the machine learning model based on the second value of the evaluation metric; and
reverting to the selected number of the plurality of client computing devices in response to comparing the second value of the evaluation metric to the first value of the evaluation metric.

* * * * *